Patented June 5, 1951

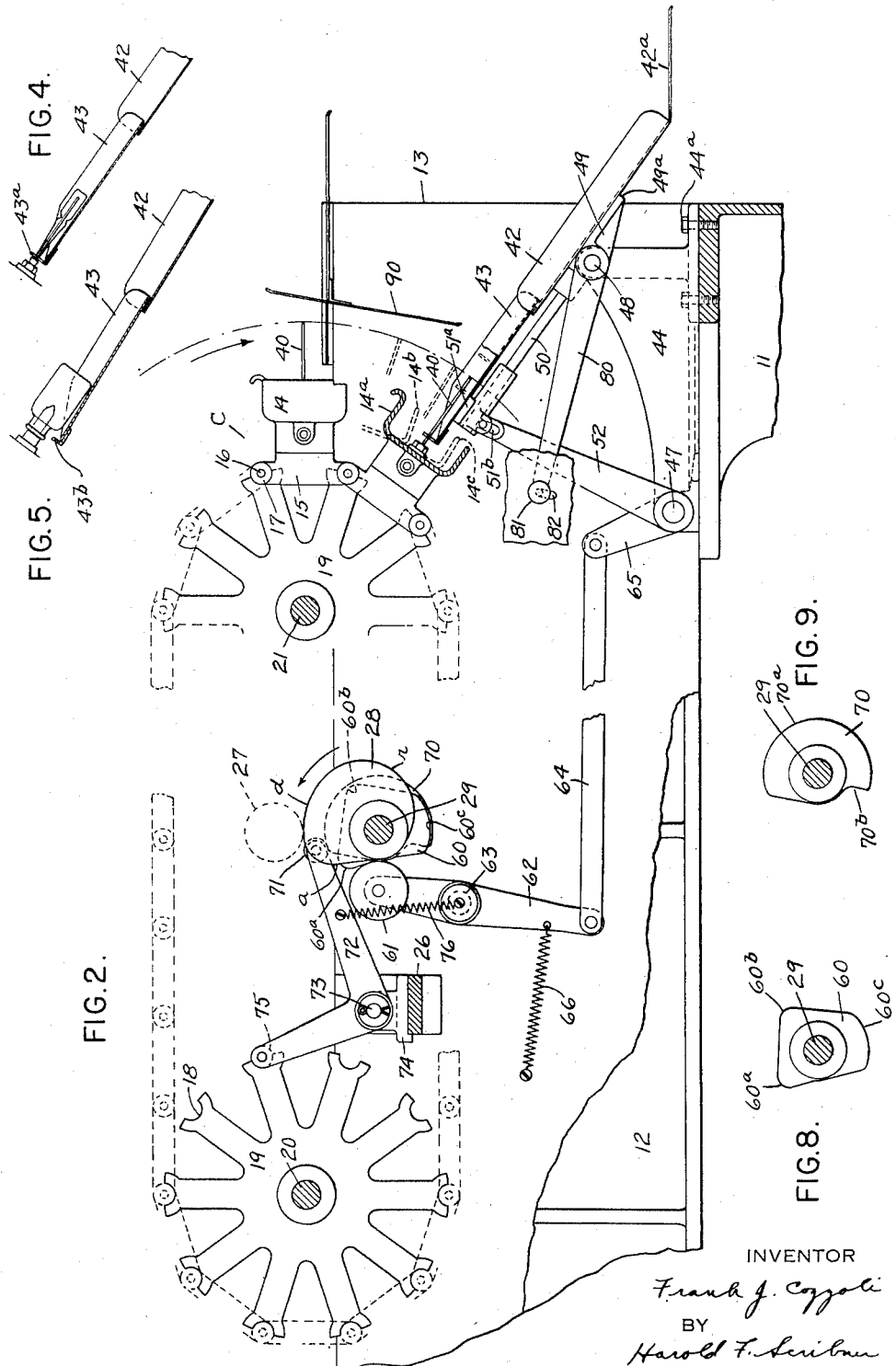

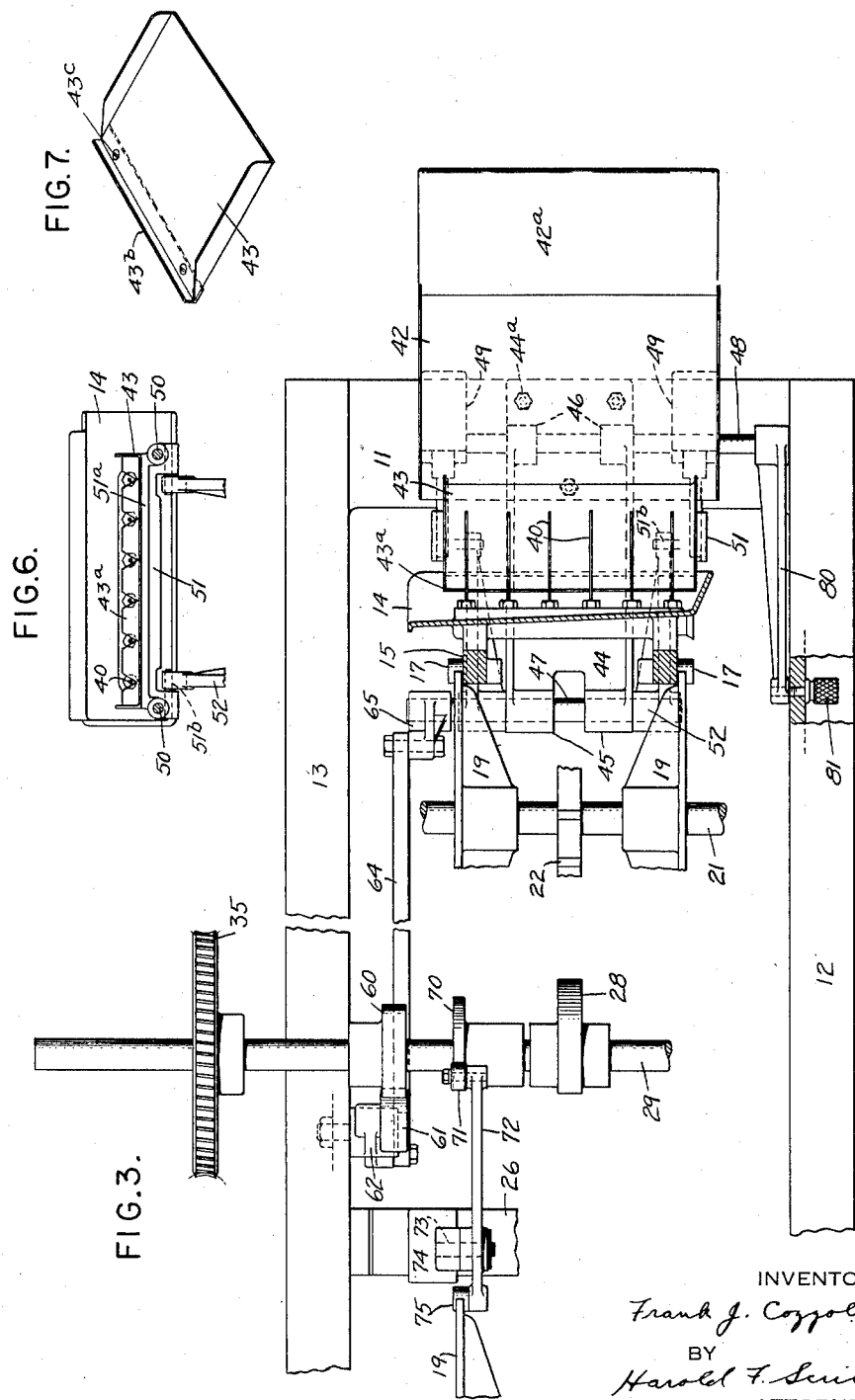

2,555,875

UNITED STATES PATENT OFFICE 2,555,875

DELIVERY MECHANISM FOR WASHING MACHINES

Frank J. Cozzoli, Plainfield, N. J.

Application February 21, 1947, Serial No. 730,071

6 Claims. (Cl. 198—24)

This invention relates to vial and ampul washing machines and more particularly to an improved mechanism for insuring removal of the washed ampuls or vials from the processing jets on completion of the processing operation. The invention is more especially adapted for washing machines of the conveyor type, such as disclosed in my prior Patent #2,381,436, wherein an endless conveyor carries successive series of ampul carrying jets from a loading station through a succession of processing stations to a chute type of delivery station where they are caused to be delivered in a semi-dry condition. Occasionally, however, a washed container has been found to adhere to the processing jet and be carried past the delivery station and often causing injury to the processing jets as well as container fracture. With a view toward overcoming the aforementioned difficulties and of obtaining certainty in ampul or vial removal at the delivery station of the washer, the present invention proposes a delivery mechanism which is mechanically actuated in timed relation with the conveyor movement positively to remove the ampuls from their respective supporting jets as the successive jets arrive at the delivery station.

In its more general aspects, the invention undertakes to provide a delivery mechanism which functions as a delivery guide for conducting washed ampuls away from the moving elements of the machine, under normal conditions of operation, and simultaneously as a means for insuring removal of the ampuls should any adhere to the processing tubes or jets. While the present mechanism is adapted more specifically to a conveyor type of washing machine wherein the container carrier and processing tubes are in a form of an endless band and movable intermittently about horizontal axes, the invention is also adaptable to insure delivery of the washed ampuls or vials from other types of intermittently movable carriers.

By way of additional improvement and to further the objective of insuring removal of the containers from the processing jets, the invention proposes a coacting means and mechanism operable automatically to lock the intermittently movable carrier in its position of rest during operation of the delivery mechanism and automatically to unlock the carrier at the conclusion of the delivery operation and just prior to the succeeding index movement thereof.

A further aim of the invention is to render available a combined extractor and delivery guide that operates automatically to provide an unobstructed passageway for the movable carrier and processing jets during the transition period between stops and which also is automatically positioned in the path of travel of the washed containers, as the latter arrive at the delivery station, to receive and guide the washed container away from the movable mechanism.

Still a further objective of the invention is to render available a combined conveyor lock and delivery mechanism of the above character that is constructed of relatively few and uncomplicated parts for the purpose of facilitating manufacture and assembly, and a device that embodies adjustable characteristics enabling proper adaption of the delivery mechanism to ampuls and vials of various sizes and shapes. For example, an ampul washer of the type herein disclosed is constructed to cleanse containers from ⅜ inch to 1½ inches in diameter and as the container supports arrive at the delivery station the peripheries of the different sized containers carried thereby will occupy different positions away from the axes of the supports. Accordingly, this invention proposes a mechanism that is capable of adjustment whereby properly to relate the receiving surface of the delivery chute in the proper spatial position relative to the ampul or vial periphery as it arrives at the delivery station. While it is desirable that the processed containers be allowed to ride or slide off the processing jets (which also functions as container supports) of their own free will it is important that the action not be impeded by the proximity of the delivery chute and equally important that the chute be spaced sufficiently close to the container so as to catch and guide the container as it slides off its supporting jet so as to avoid possibility of chipping or fracture of the fragile containers. To these ends, the present invention proposes a delivery mechanism embodying conveniently operable means for adjusting the plane of the delivery chute at the proper location with regard to the size of the container that is undergoing processing.

Another objective of the invention is to provide a mechanically operated delivery mechanism suitable for attachment as a unitary assembly to existing machines without extensive alteration.

In carrying forward the aims of this invention it is proposed to construct a delivery chute preferably in two sections, one of which is normally fixed and the other of which is adapted for reciprocatory movement within the normally fixed section. Each section of the chute is formed with side walls, but the movable section is also equipped with a transversely arranged removable upturned lip along its leading edge that operates to propel or withdraw any adhering ampul or vial from its supporting jet. The delivery end of the normally fixed section may be left open and unobstructed, but preferably is provided with a shelf upon which the washed containers come to rest after sliding down the inclined chute. The general plane of the sectional chute is inclined upwards from a horizontal position and the movable section extended relative to the fixed section, at the proper time, to underlie the container and its supporting jet as they arrive at the delivery station. Normally, when in that inclined position, the containers will slide off their respective supports of their own free will, but to insure removal, however, the movable chute section with is upturned lip is, in accordance with this invention, arranged to move outward one or more times, within the fixed chute.

The outward movement of the movable chute brings its upturned lip end into engagement with any ampul that tends to adhere or cling to its processing jet, and gently propels the container off the jet. The main body of the chute closely underlies the container and receives the container as it comes off the jet. When, as herein proposed, the movable chute is given a succession of reciprocations on each delivery cycle, the preceeding containers are urged thereby downwardly along the incline so as always to provide a clear space at the leading end of the chute for receiving succeeding containers as they arrive at the delivery stations.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a side view of a portion of an ampul washing machine, partly broken away to better illustrate the elements of the conveyor lock and container delivery actuating mechanisms.

Fig. 2 is an enlarged skeleton view of elements of the lock and delivery mechanism, showing their relation to certain of the cooperating washing machine elements.

Fig. 3 is a plan view of the mechanisms illustrated in Fig. 2.

Figs. 4 and 5 are side views of an ampul and a vial at the delivery station and their respective relations with the delivery chute.

Fig. 6 is an open view of a washing tray illustrating a notched lip type of delivery chute in operative position relative to the container supports of the tray.

Fig. 7 is a perspective view of the movable chute section equipped with a lip adapted primarily for removing vial type of containers.

Figs. 8 and 9 are end views of the delivery-mechanism and carrier-lock actuating cams respectively.

Figure 1:
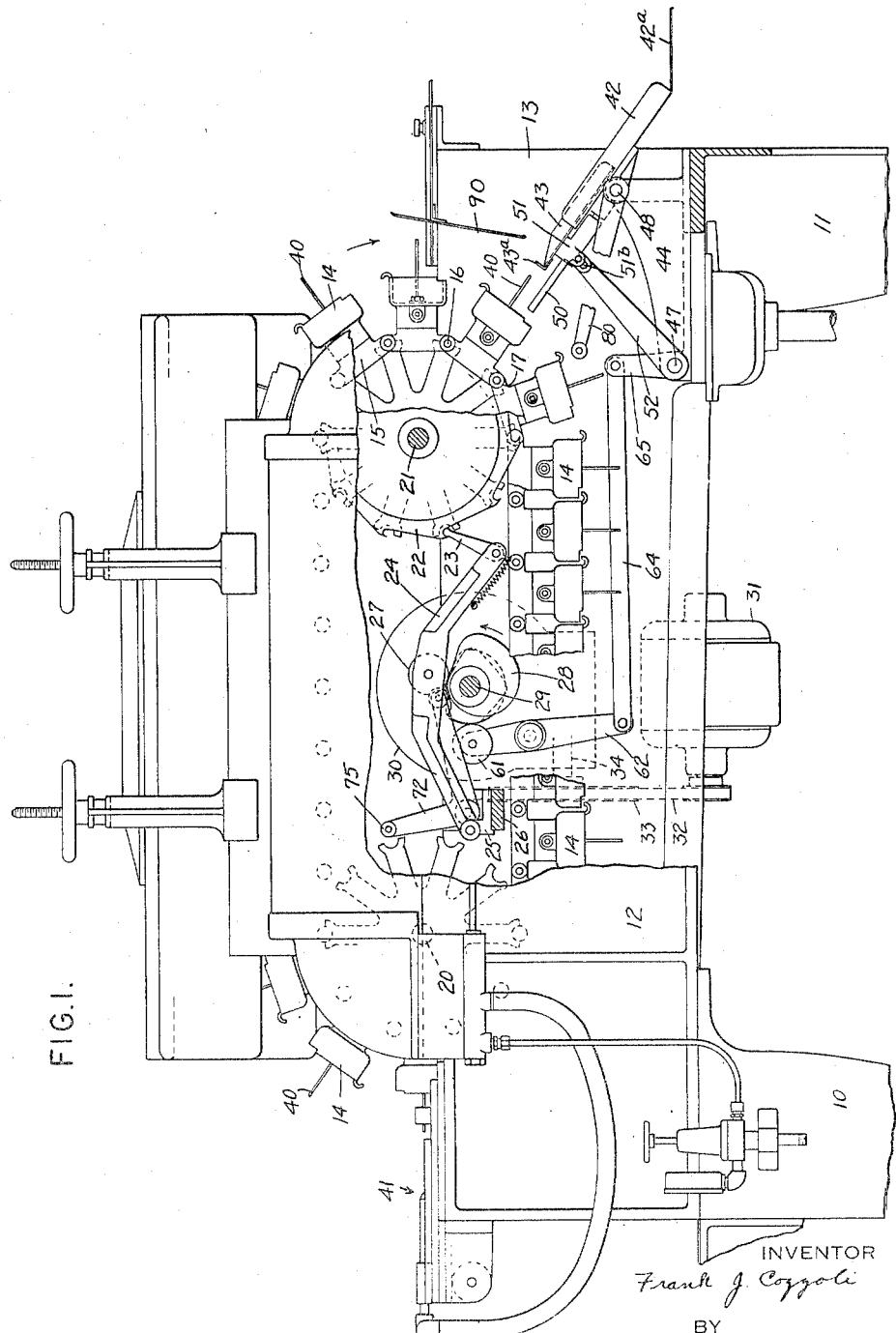

Referring more particularly to Figure 1 of the drawings, the invention is illustrated embodied in a conveyor type washing machine having a pair of leg standards 10 and 11 (shown partly broken away) upon which is firmly secured a pair of parallel spaced frame members 12 and 13. Upon and between the frame members substantially all of the mechanisms of the washing machine including the conveyor, are mounted. In the instant embodiment, the conveyor indicated by the legend C, is composed of a series of open ended trays 14, each of which is securely fastened at its ends to links 15. The conveyor's total complement of trays is 26, but in the interest of clarity all of the trays have not been illustrated. The links 15 are pivotally connected together by pins 16, which pins, also carry rollers 17 adapted to interfit with notches 18 formed in sprocket wheels 19. The axes of the sprocket wheels are horizontal and spaced from each other so as to form horizontal upper and lower conveyor runs and arcuate conveyor end runs. Two bands of the links 15 are employed, one at each side, and four of the sprocket wheels 19, two at each end, as will be understood from the drawings. The pairs of sprocket wheels are pinned fast and in phase to transverse shafts 20 and 21 respectively each of which journaled in end bearings (not shown) that are supported by the frame members 12 and 13. The sprocket shaft 21, however, also has a ratchet wheel 22 secured thereto, the teeth of which are intermittently engaged by a pawl 23 carried at the free end of an index lever 24. The lever 24 is pivoted at its other end to a bearing bracket 25 carried by a shelf 26 that extends between the two side frame members. Intermediate its ends, the lever 24 carries a follower roll 27 that is engaged by an index cam 28. The cam 28 is secured to a cam shaft 29 that is journaled in bearings carried by the frame members. One end of the cam shaft extends into a reduction housing 30 mounted on the side of the machine and drive means including a motor 31, belt 32, worm shaft pulley 33, worm shaft 34, worm wheel gear 35, secured to the cam shaft 29, serve as a preferred means for slowly rotating the cam shaft thereby to effect intermittent movement of the container carrier. As illustrated more clearly in Fig. 2 the index cam 28 is formed with an ascending portion, $a$, a dwell portion $d$, and a pawl reset portion $r$, of such arcuate lengths that approximately ¼ turn of the cam shaft effects the index movement, ¼ turn for index lever dwell, and ½ turn for the resetting movement of the lever and its pawl preparatory to the next index cycle.

Each of the conveyor trays 14 carries a series of tubular container supports 40 upon which the containers to be washed, for example ampuls, are loaded by a feeder mechanism indicated generally at 41. As the character of the feeder forms no part of the instant invention and is disclosed more fully in my earlier Patent #2,381,436 description thereof is deemed unnecessary. Suffice it to say that the containers are placed upon the tubular supports when in horizontal position, progressively indexed through eight processing stations which are provided along the upper horizontal run of the conveyor, and then to a delivery station shown at the right hand side of the Figs. 1 and 2. The processing of the containers is effected by injecting water, steam, or other cleansing agents through the supporting tubes 40 which receive the liquids as disclosed in my aforesaid patent. At the delivery station the tray comes to rest in a downwardly inclined position 14a and the washed ampuls are intended to slide off their supports onto a delivery chute. Occasionally, however, one or more containers has been found to cling to their supports, and on the next index movement the container is fractured and the supports damaged.

To eliminate that hazardous condition, it is now proposed to construct a delivery mechanism that will aid in the removal of any adhering container. A preferred form of such a mechanism includes a normally fixed chute 42 and a relatively movable chute 43, the latter being movable within the fixed chute and, at the proper time, extended to a position underlying the container supporting tubes 40. Preferably the improved delivery mechanism is constructed as a unitary assembly for ease in installing especially in existing machines. To that end a main base 44 is constructed with two pairs of bearing eyes 45 and 46, which journal shaft elements 47 and 48 respectively. The shaft 48 has two brackets 49 secured thereto, each of which is provided with a pad 49a to which the normally fixed chute section 42 is secured. The brackets 49 also provide supports for two parallel arranged guide bars 50 along which a crosshead member 51 is adapted to slide.

The crosshead 51 is also formed with a pad 51a to which the movable chute section 43 is secured in overlapping relation with the fixed chute as illustrated in Figs. 1–5. The movable crosshead 51 has a pin and slot connections 51b with the free end of each of two levers 52 that are secured to the shaft 47 previously mentioned. By virtue of these connections the movable chute section is caused to reciprocate along the guide bars 50 upon oscillatory movement of the shaft 47.

Power for rocking of the shaft 47 to effect reciprocatory movement of the delivery chute, is derived from the main cam shaft 29, by means of another cam 60. The cam 60 is preferably somewhat triangular in shape (Figures 2 and 8) and engages a follower roller 61 carried at one end of a lever 62. The lever 62 is pivoted at 63 to the side frame 13 and is connected at its lower end to a horizontally extending link 64. At the end opposite the lever 62, the link 64 is pivotally connected to a short lever 65 fastened to the rock shaft 47. As viewed in Fig. 2, the cam shaft 29 rotates counterclockwise, and in the position shown, the conveyor is at rest, the delivery lever follower roll 61 is "in" and also the movable chute section 43. A slight further movement of the cam shaft causes one of the lobes 60a of the delivery cam 60 to move the follower 61 outwardly, and such movement, through the linkages described, retracts the movable chute section 43 a slight distance. As that lobe 60a of the cam 60 passes the follower 61, a low zone is reached and the follower again moves "in" and likewise the movable chute section. This reciprocatory action is repeated by lobe 60b. Thereafter a high dwell zone 60c engages the follower and moves it outwardly to its extreme position and holds it out for approximately ¼ turn of the cam shaft. When in that position (see Fig. 1) the movable chute is retracted its full distance whereby to permit passage of the conveyor tray and its container supports, on the next index movement which is about to start. A pull spring 66 connected between the lever 62 and the frame of the machine tensions the follower 61 against the cam 60 and acts as a yield device on the "in" movement of the movable chute should inadvertently there be interference such as a badly deformed container. It will be observed that substantially all of the delivery mechanism is mounted upon and forms a unitary assembly with the base member 44. Such an assembly is adapted for convenient manufacture and installation not only in machines in the course of construction but also in existing machines already in service. To install the assembly it is necessary only to fasten the base member 44 by screws 44a (see Fig. 2) to a stationary part of the machine such as the top of the leg standard 11, locate and form the slot 82 in the frame 12, mount the pivot stud 63 and attach the delivery cam 60 to the cam shaft 29 in its proper phase relation with the index cam 28.

During the oscillatory movement of the delivery chute, the conveyor C is locked and held against movement by the action of a third cam 70 that is also mounted upon the cam shaft 29. The cam 70 is approximately circular, being ¾ round and ¼ flattened, and arranged to actuate a follower 71 carried by one of the arms of a bell-crank lever 72. The lever is pivotally supported at 73 on a bracket 74 carried by the shelf 26, and carries at the end of its other arm a sprocket wheel engaging roller 75. The bell-crank lever arms are spread approximately 90° apart so that the locking roller 75 engages in one of the notches 18 of the conveyor sprocket wheel 19 when the follower 71 is engaged by the surface 70a of the lock cam at the completion of the index movement (Fig. 2). With the parts so located the follower 71 is caused to track the circular portion 70a of the cam 70 and holds the conveyor locked while the cam shaft 29 continues to revolve and actuate the delivery mechanism and reset the index lever and pawl. However, just prior to the start of the next index movement, a low portion 70b of the locking cam 70 reaches the follower 71 and the latter moves "in," simultaneously withdrawing the lock roller 75 from the notch in the sprocket wheel. The withdrawing action is caused by a spring 76 connected to the bell-crank lever 72 and a stationary part of the machine, e. g. the pivot stud 63 of the delivery chute actuating lever.

Figs. 4 and 5 illustrate the relations of the carrier tray and container support and the delivery chute when delivering small ampuls and vials respectively. In the former diagram, the chute 43 is positioned relatively close to the container support because of the slenderness of the ampul, and in the latter diagram, further away because of the larger diameter of the vial. In all cases, however, the movable chute should be freely movable and telescope within the fixed chute. The dual purpose brackets 49 maintain those relations, but are mounted to the shaft 48 which in turn is mounted for angular adjustment in the bearing eyes 46 in the base member 44. The means for adjusting the shaft 48, whereby to tip the upper end of the chute toward or away from the axes of the container supports may comprise a lever 80 which is secured at one end to the shaft 48 and clamped at its other end to a stationary part of the machine, e. g. the frame member 12. To provide for convenient adjusting, a knurled handle and clamp screw 81, accessible from the exterior of the machine, is threaded into the free end of the lever 80 and is movable therewith. The clamp screw is formed with a collar portion that engages the exterior surface of the frame, and a threaded stem portion that extends through a slot 82 in the frame 12, into the lever 80. When the handle 81 is tightened, the lever 80 is clamped to the frame, and when the handle is loosened slightly, the lever 80 may be rocked slightly. The extent of movement of the lever is limited by the amount necessary to position the delivery chute properly with relation to the container. Too great an adjustment of the chute would allow the vials or ampuls to fall a dangerous distance and possibly interfere with the movement of the chute to its "in" position. The first "in" movement of the chute must be completed after the leading side of a conveyor tray passes the dotted line position 14c in Fig. 2, and before the tray comes to rest in position 14a (full lines, Fig. 2), so as to be under the vials or ampuls by the time the conveyor stops moving. Accordingly, to guard against an over adjustment of the delivery chute, the slot 82 in the frame, is preferably of a length adequate to permit chute adjustment for all ampul or vial sizes that the machine is adapted to process, without unnecessary excess. Also, by constructing the lever 80 of a length substantially equalling the extended length of the delivery chute, the distance that the handle 81 is moved in the slot 82 will give a fair index of the amount that the end of the delivery chute is moved toward or away from the axes of the container supports.

The open end view of a conveyor tray represented in Fig. 6, illustrates the movable chute equipped with a notched lip 43a in which V notches are formed that receive the processing supports. This style of lip is adapted more particularly for the removal of ampuls which have long slender necks. As the delivery chute moves outwardly, its notched end "combs" the processing tubes and removes therefrom any adhering or clinging ampul. Because of the tapered neck shape of the ampul, some portion thereof is soon engaged by the sides of the V notches and withdrawn from the processing tubes. In the case of the vials, which have rather blunt ends or shoulders, a shallow lip 43b such as illustrated in Figs. 5 and 7 is to be preferred. For convenience in changing from one to the other, the upturned lips are preferably made as separate angle pieces, and either, as desired, may be attached to the body 43, by two or more screws 43c.

Ordinarily, the ampuls or vials will stay on their respective supports (processing tubes) as they are carried around the end run of the conveyor to the delivery station but to guard against their riding out on the supports 40 prematurely, an adjustable shield 90 is provided. The shield extends downwardly from a point above the horizontal axes of the conveyor, to a point just above the delivery chute, and across all the container supports so that any container that tends to move out before reaching the delivery station, is restrained and guided toward the delivery chute without unnecessary falling.

The mechanism operates as follows: With the parts in the position illustrated in Fig. 1, the conveyor is about to start on an indexing cycle, the conveyor sprocket is unlocked, and the delivery chute section 43 is retracted. The carrier will then advance (clockwise in the figure) one station, and will come to rest in the position illustrated in Fig. 2. However, as the container tray 14 reaches the position marked 14b in Fig. 2, the movable chute section starts moving inwardly and after the leading side of the tray (position 14c) passes the line of movement of the chute, the chute will move inwardly its full distance (full line position, Fig. 2) and be in position underlying the container supports 40 as they arrive in the delivery position, 14a. At this point in the cycle, the index lever follower 27 will be upon the dwell portion d of the index cam 28, and conveyor lock follower 71 upon the circular portion 70a of the lock cam 70, whereupon the carrier will be locked against movement. The cam shaft 29, however, continues to turn and the lobes 60a and 60b of the triangular cam 60 oscillates the follower 61 and lever 62, and effects movement of link 64, levers 65 and 52 which in turn, impart a reciprocatory movement to the delivery chute section 43. The initial stroke of the chute section being in an outward direction, effects removal of any ampul or vial that may still cling to its support. Ordinarily, however, the containers will slide off their supports and on to the chute as the supports reach their downwardly inclined position. The containers slide down the inclined chute sections 43 and 42 and come to rest on a generally horizontal platform 42a, where they may be picked up conveniently by the attendant. The platform 42a may of course be omitted, or slanted downwardly from horizontal, so as to allow the washed containers to slide into a basket, etc. In the event that the initial outward stroke of the movable chute section fails to dislodge a container, the succeeding reciprocations of the chute will effect such dislodgement and simultaneously advance the containers along the chute thereby always keeping the area of the chute immediately under the supports 40 clear to receive successive groups as they arrive at the delivery station. After the movable chute has been reciprocated several times, the delivery cam 60 will have rotated to a position whereat the follower 69 tracks the circular high portion 60c, and the extensible chute section 43 is withdrawn to the position indicated in Fig. 1. After the lipped end of the chute is clear of the tray 14 and needle tubes 40, the latter are indexed past the delivery station and chute, on the next index cycle.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements or equivalents thereof, by Letters Patent of the United States:

1. A machine having a series of processing tubes adapted to support containers, and said machine having means for moving said tubes intermittently and successively to and past a container delivery station, combining means for removing containers from said tubes successively upon their arrival at the delivery station comprising a normally fixed but adjustable support, a guide member movable along said support operative normally in the general plane of movement of said tubes, means including a lever and clamp means operable from the exterior of the machine to effect an adjustment of the normally fixed support in a direction substantially normal to the direction of movement of the guide member along the support whereby to vary the spatial distance between the said guide and the axes of the tubes, means operative to actuate said guide member from a position out of the path of movement thereof to a position into the path of movement and between two successive tubes thereby to receive the containers upon their arrival at the delivery station, and said means being also operative to reciprocate said guide member through a distance less than the full movement thereof during the period of rest of the tubes while at said station, and thereafter to withdraw said guide member from the path of movement of the said tubes prior to the next movement thereof.

2. A means for removing an ampul, vial or like container from a laterally movable support, comprising a movable tray shaped member provided with an upturned lip across its leading end, guide means for the tray member, means to position said tray member in the normal path of movement of the said support and in operative position to receive the container carried thereby, means operative to impart a succession of rectilinear movements to said tray while in said operative position so as to cause its said upturned lip to engage with and remove the container from the said support, said means thereafter operative to withdraw said tray to an ineffective position away from the path of movement of the support to allow the latter to pass, and means to adjust said guide means in a direction normal to the plane of the receiving surface of the tray whereby to position the receiving surface of the tray a preselected distance away from the axis of the container to be received thereon.

3. In a machine for washing ampuls, vials, and like containers and having a carrier mechanism equipped with devices adapted to support and transport the containers through one or more processing stations to a delivery station combining means at the delivery station for removing the containers from the carrier, comprising a delivery guide normally retained in retracted position during the period of movement of said carrier, and spring means operatively connected with said delivery guide and tensioned normally to project said guide into a position between successive container supporting devices so as to receive the containers as they arrive at the delivery station, said delivery guide having a container engaging lip at its outer end, and cam means actuated in timed relation with the movement of the carrier and operative on said delivery guide in opposition to the tension of said spring, said cam means having a high portion corresponding to the retracted position of the guide and a plurality of low portions corresponding to an operative position of said guide, said plurality of low portions being constructed and arranged to impart to said guide a succession of short retracting movements followed by a full retracting movement whereby to cause said lip to engage and withdraw containers from said supporting devices while said supporting devices are at the delivery station and thereafter to withdraw said guide in opposition to the action of said spring means out of the path of movement of said supporting devices on completion of the container removing operation.

4. A washing machine combining a movable carrier equipped with a series of elongated supports for mounting ampuls, vials, or similar containers thereover and to carry them through a washing cycle to a delivery station, means to move the carrier intermittently, and means at the delivery station operative to remove the containers from their supports during the rest period of the carrier comprising a two-part telescopically arranged delivery chute, both of said chute parts being arranged in a plane substantially paralleling the axis of the container supports when at rest in the delivery station and both of said parts normally being positioned out of the path of movement of the said elongated supports and one of said chute parts being relatively movable to a position into the path of movement of the container supports, means for moving the movable chute part into the path of movement of the container supports to a position operative to engage with the containers, and thereafter to a position out of the path of movement of the container supports.

5. The combination set forth in claim 4 in which the axis of the container supports at the delivery station of the machine and the planes of the delivery chutes are downwardly inclined relative to a horizontal plane so that the containers slide by gravity from the movable chute part to the stationary chute part.

6. The combination set forth in claim 2 in which the means to adjust said guide means comprises a rock shaft arranged to support said guide means in fixed relation therewith, and a lever secured to said shaft for adjusting same whereby to adjust the said guide means.

FRANK J. COZZOLI.

REFERENCES CITED

The following references are of record in the file of this patent:

UNITED STATES PATENTS

| Number | Name | Date |
| --- | --- | --- |
| 1,373,113 | Beardsley | Mar. 29, 1921 |
| 1,506,632 | Gruetter | Aug. 26, 1924 |
| 1,759,506 | Hauk | May 20, 1930 |
| 1,856,976 | Strelow | May 3, 1932 |
| 2,073,945 | Risser | Mar. 16, 1937 |
| 2,134,955 | Risser | Nov. 1, 1938 |
| 2,381,436 | Cozzoli | Aug. 7, 1945 |